Figure 1:
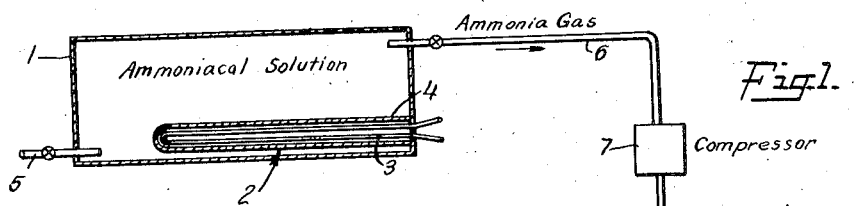

April 28, 1936.  E. W. HARVEY  2,038,562
PROCESS FOR THE PREPARATION OF A MIXTURE OF OXYGEN AND AMMONIA GASES
Filed June 21, 1933   2 Sheets-Sheet 1

INVENTOR
EDWARD W HARVEY
BY
ATTORNEY

April 28, 1936. E. W. HARVEY 2,038,562
PROCESS FOR THE PREPARATION OF A MIXTURE OF OXYGEN AND AMMONIA GASES
Filed June 21, 1933 2 Sheets-Sheet 2
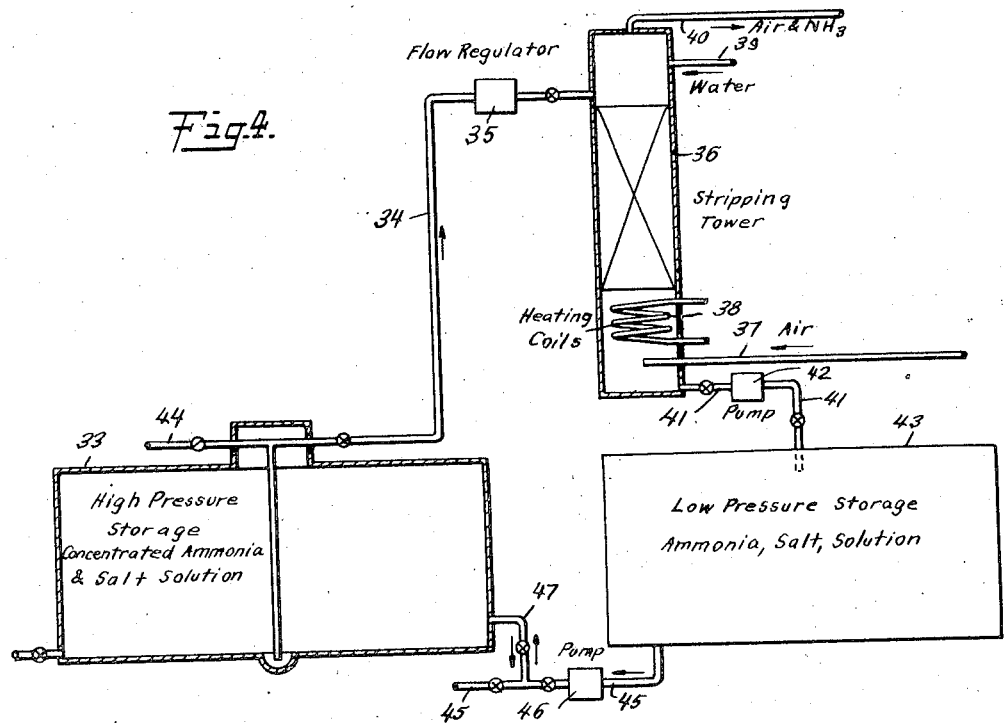
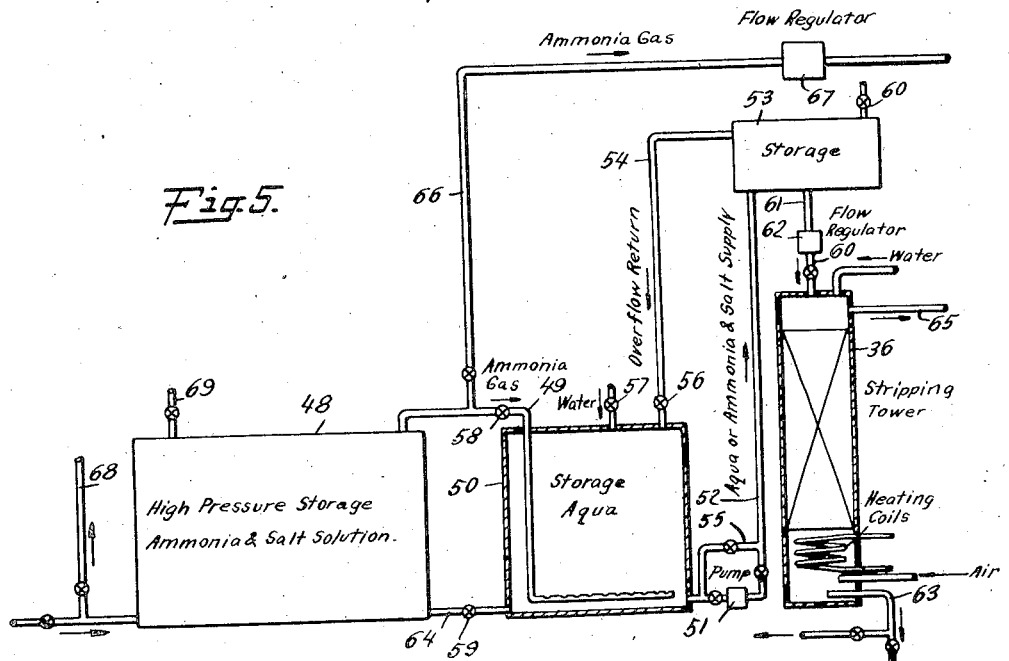
INVENTOR
EDWARD W HARVEY
BY
ATTORNEY Patented Apr. 28, 1936

2,038,562

UNITED STATES PATENT OFFICE 2,038,562

PROCESS FOR THE PREPARATION OF A MIXTURE OF OXYGEN AND AMMONIA GASES

Edward W. Harvey, Highland Park, N. J., assignor to The Barrett Company, New York, N. Y., a corporation of New Jersey Application June 21, 1933, Serial No. 676,786

1 Claim. (Cl. 23—193)

This invention relates to a method for the transportation of ammonia and of solid materials soluble in ammoniacal liquids, and for the recovery of ammonia from solutions containing it, together with other ingredients. The invention further relates to apparatus for the treatment of ammoniacal solutions for the recovery of ammonia therefrom.

It has heretofore been known that numerous solid substances, such as urea, sodium nitrate, ammonium nitrate and the like, are soluble in liquid anhydrous ammonia and in aqua ammonia. It has also been heretofore proposed to utilize the solubility of such substances in ammoniacal liquids for the purpose of carrying out chemical reactions between two or more materials, particularly double decomposition reactions, between salts.

It is an object of this invention to provide an economical method for the transportation of ammonia and of solid materials soluble in ammoniacal liquids, i. e., in liquid anhydrous ammonia or in aqueous solutions of ammonia, particularly aqueous solutions containing relatively high concentrations of ammonia, and to store such materials under conditions particularly advantageous with respect to the vapor pressure of the stored materials. It is a further object of this invention to provide a method for the transportation of ammonia and solid materials in the form of a solution of the solid in an ammoniacal liquid and to recover from such solutions ammonia for use separately from the other constituents of the solution. Another object of the invention is to provide a process and apparatus for the storage and treatment of ammoniacal solutions whereby ammonia may be recovered from an ammoniacal solution of a solid substance and the recovered ammonia stored either separately from the other constituents of the solution or directly utilized, for example, by mixing it with an oxygen gas to form a gaseous mixture suitable for catalytic treatment to oxidize the ammonia. Further objects of the invention will be obvious or will appear hereinafter.

In employing the process of this invention for the transportation and storage of ammonia and a solid material which is soluble in ammoniacal liquid, a solution of the material in an ammoniacal liquid is prepared and transported. After transportation the solution is treated to vaporize a desired proportion of its ammonia content and the resulting residue may then be stored while the ammonia which was vaporized may be mixed with an oxygen gas and the mixture catalytically treated for the oxidation of ammonia, or the vaporized ammonia may be condensed to form a liquid or, without condensation, may be absorbed in water and the ammoniacal liquid as prepared by either of these methods may be stored or utilized directly as may be desired.

The accompanying drawings are illustrative of various types of apparatus suitable for use in carrying out the processes of this invention. In the drawings Figs. 1 to 5 illustrate diagrammatically various modifications of the apparatus of this invention, and examples of the process of the invention will be described in conjunction with a description of the several apparatuses shown.

With reference to Fig. 1, the numeral 1 indicates a storage vessel capable of withstanding pressures above atmospheric and provided with a heating unit 2 for heating a liquid in vessel 1 by means of steam introduced through pipe 3 and passing through the space between pipe 3 and an outer pipe 4.

A solution of sodium nitrate in an ammoniacal liquid may be prepared for transportation, as for example by dissolving solid sodium nitrate in anhydrous liquid ammonia or in aqua ammonia, of relatively high concentration, for example, an aqua ammonia containing about equal proportions of water and ammonia. Such liquid anhydrous ammonia or concentrated aqua ammonia at ordinary temperatures has vapor pressures materially in excess of atmospheric pressure. By dissolving the sodium nitrate in the ammoniacal liquid the vapor pressure of the liquid may be substantially reduced thereby facilitating its transportation in sealed containers of sufficient strength to withstand the reduced vapor pressures of the solution. The use of an ammoniacal solution of sodium nitrate for transportation of the ingredients of the solution is also advantageous since such solutions occupy a smaller volume than do the several constituents of the solution, and this characteristic of the solutions makes their use for the transportation of the ingredients of the solution advantageous.

After transportation the ammoniacal solution of sodium nitrate is introduced into storage vessel 1 through a pipe 5. Ammonia gas is vaporized from the solution in tank 1 and is withdrawn through a pipe 6 and compressor 7 and passed to a cooling coil 8 where the vaporized ammonia is cooled to condense it as a liquid condensate which is passed through a pipe 9 into a storage vessel 10. The vaporization of ammonia from the solution introduced into tank 1 may be facilitated by heating the solution by means of heating unit 2. The condensate formed in cooling coil 8 may be a substantially anhydrous liquid ammonia which, if desired, may be stored as such in vessel 10, or the liquid ammonia condensate may be mixed with water in a desired proportion to form an aqueous ammoniacal solution which may then be stored in tank 10 until such time as it may be desired for use.

If desired, substantially all of the ammonia content in the solution introduced into tank 1 may be vaporized and transferred to tank 10 for storage and, if the ammoniacal solution introduced into tank 1 contains water, the residual salt solution thus obtained may be evaporated to dryness and the solid salt recovered for use, or the aqueous solution of the salt which, if desired, may contain a portion of the ammonia originally in the solution introduced into tank 1, may be withdrawn from this tank and used in the preparation of fertilizers as, for example, by adding the ammoniacal solution to an acidic fertilizer material such as a superphosphate.

Figure 2:
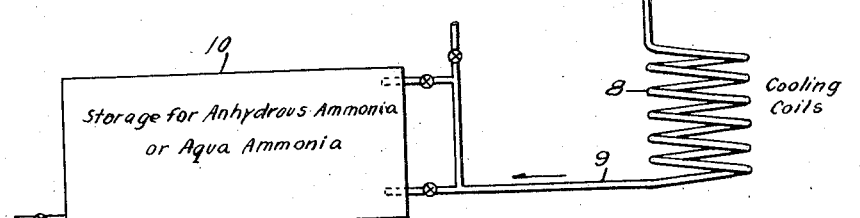
Figure 2:
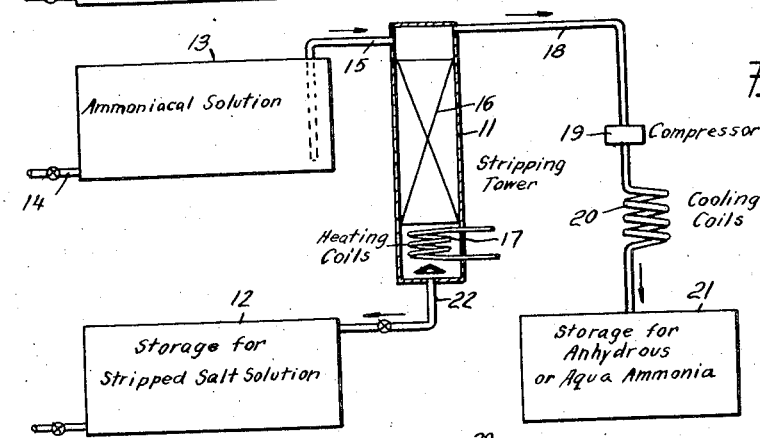

The apparatus shown in Fig. 2 is similar to that of Fig. 1 except that it comprises a stripping tower 11 and storage tank 12 not present in the apparatus of Fig. 1.

In utilizing the apparatus of Fig. 2 for the treatment of an ammoniacal solution of sodium nitrate, the solution is introduced into a tank 13 through a pipe 14 and is withdrawn in desired proportion from tank 13 through a pipe 15 and introduced into the top of stripping tower 11. Stripping tower 11 may contain a packing material 16 and be provided with heating coils 17. The solution in passing downwardly through tower 11 is intimately contacted with a mixture of gaseous ammonia and water vapor, which may be evolved by heating solution in the bottom of tower 11, and absorbs water vapor from this vapor mixture. The unabsorbed ammonia passes out of the top of tower 11 through a pipe 18 leading to a compressor 19 and cooling coils 20 where the ammonia is condensed and the condensate passed into a storage tank 21 where it is stored either as a substantially anhydrous liquid ammonia condensed in cooling coil 20 or is mixed with water and the resulting aqueous ammonia stored in tank 21. The solution in the bottom of tower 11 from which a desired proportion or all of the ammonia has been removed flows out of the tower through a pipe 22 to a storage vessel 12 where the salt solution is stored until desired for use. The rate of flow of solution from pipe 15 and the rate of heating by coil 17 may be so controlled as to produce a desired degree of separation or fractionation of water and ammonia.

Figure 3:
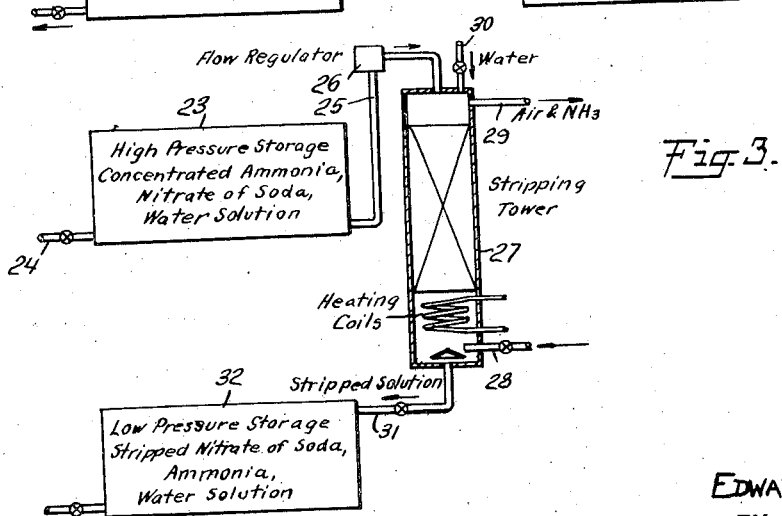

The apparatus shown in Fig. 3 comprises a storage vessel 23 into which a solution of a solid substance in an ammoniacal liquid may be introduced through a pipe 24 and from which the solution may be passed through a pipe 25 in amounts regulated by a flow regulator 26 into the top of a stripping tower 27 which, like the stripping tower of the apparatus of Fig. 2, is provided with packing and heating coils. Air or air enriched with oxygen is introduced into the bottom of stripping tower 27 through an inlet pipe 28 and in passing upwardly through the tower in direct contact and in countercurrent flow with the ammoniacal solution descending through the tower vaporizes from the solution ammonia gas which forms with the air a mixture of gases containing ammonia and oxygen which is withdrawn from the top of the tower through an outlet pipe 29. By suitable regulation of the degree of heating of the liquid and air by means of the heating coils in the bottom of tower 27 and of the proportions of air and solution passed in contact with each other in the tower, the proportion of the ammonia in the solution which is vaporized and ratio of ammonia to oxygen in the resulting mixture of gases may be controlled. Water may also be introduced into the top of tower 27, through a pipe 30 and thus mixed with the ammoniacal solution at a point near to that at which the solution first comes into contact with the air passed through the tower.

By controlling the proportions of water and ammoniacal solution introduced into the tower the degree of removal of ammonia from the solution may be varied independently of the control of the degree of ammonia removal by means of the heating of the solution in the bottom of the tower and the proportions of air and solution contacted with each other. This introduction of the water also provides a means for adding a desired proportion of water to the sodium nitrate solution, for example, which leaves the bottom of tower 27 and passes through a pipe 31 into a storage tank 32. The solution in storage tank 32 may be used for fertilizer manufacture or, if desired, by completely removing the ammonia from the solution introduced into tower 27, the sodium nitrate may be recovered as the solid from the solution leaving the tower. In such a case it is desirable to introduce little or no water into the solution being treated in tower 27.

The apparatus shown in Fig. 4 comprises a storage vessel 33 into which an ammoniacal solution of urea, for example, containing a relatively high proportion of ammonia may be introduced and from which the solution may be withdrawn through a pipe 34 and flow regulator 35 and introduced into the top of a stripping tower 36. The operation of stripping tower 36 is similar to the operation of tower 27 as described in conjunction with the apparatus shown in Fig. 3. Thus the ammoniacal-urea solution flows downwardly through tower 36 in countercurrent flow with air introduced into the tower from a pipe 37, the air and solution being heated in the bottom of the tower by means of heating coils 38. Water may be introduced into the top of tower 36 from a pipe 39 and the mixture of air and ammonia withdrawn from the tower through a pipe 40 for catalytic treatment to oxidize the ammonia by means of the oxygen contained in the mixture of gases. The residue from which ammonia has been removed is withdrawn from tower 36 through a pipe 41 and pump 42 and passed to a storage vessel 43 where it is stored and from which it may be withdrawn through a pipe 45 and pump 46 for use.

In treating a urea-ammonia solution, particularly one which also contains carbon dioxide in the form of ammonium carbamate or carbonates, the introduction of water from pipe 39 and the countercurrent flow of the solution and air into which ammonia is vaporized serves to retain the carbon dioxide in the solution while removing the ammonia present in excess of the amount equivalent to that which combines with the carbon dioxide to form ammonium carbamate or carbonates. Thus, the apparatus shown in Fig. 4 is particularly suitable for the treatment of a solution containing, for example:

| | Per cent |
|---|---|
| Urea | about 33 |
| Ammonium carbamate | do 18 |
| Free ammonia | do 29 |
| Water | do 20 |

Such a solution may be stripped of all or any desired proportion of its free ammonia in tower 36 with the production of a mixture of air and ammonia suitable for catalysis to oxidize the ammonia, while a solution containing urea, ammonium carbamate and water is withdrawn to tank 43. This solution may be utilized in the production of mixed fertilizers as, for example, by its addition to superphosphate or it may be concentrated and solid urea recovered from the solution.

The apparatus of Fig. 4 also includes a pipe 44 whereby the concentrated ammoniacal solution from tank 33 may be withdrawn in any desired proportions for use directly in the production of mixed fertilizers by addition, for example, to superphosphate or mixtures containing the same. The apparatus also comprises a pipe 47 communicating between pipe 45 and tank 33, whereby solution from tank 43 may be passed into tank 33 to dilute the solution in tank 33 with respect to its ammonia content or, if desired, solution from tank 33 may be introduced into solution being withdrawn from tank 43 through pipe 45 to increase the ammonia content of the latter solution to a desired degree, particularly when this solution is to be added to superphosphate.

The apparatus shown in Fig. 5 comprises a storage tank 48 into which a solution of sodium nitrate in anhydrous liquid ammonia may be introduced. Ammonia gas may be withdrawn from the solution in tank 48, passed through a pipe 49 and introduced into water in tank 50, where the ammonia is absorbed to form aqua ammonia. The solution in tank 48 may be heated, if desired, and the aqua ammonia in tank 50 may be cooled so that a desired proportion of the ammonia in the solution in tank 48 may pass into and be absorbed by the water in tank 50. The aqua ammonia from tank 50 may be forced by means of a pump 51 through a pipe 52 into a tank 53 provided with an overflow return 54 leading back to storage tank 50. A by-pass pipe 55 about pump 51 is provided so that, if desired, by having valves 56, 57, 58, and 59 closed and by opening valve 60 in a vent from tank 53, aqua ammonia may be transferred from storage tank 50 into tank 53 by increasing the pressure upon the aqua ammonia in tank 50. From tank 53 the aqua ammonia is withdrawn through a pipe 61 and flow regulator 62 into a stripping tower 36 like tower 36 of Fig. 4, wherein the aqua ammonia is treated with air in the manner described above for the treatment of the urea-ammonia solution in the apparatus of Fig. 4, to vaporize ammonia from the aqua ammonia with the formation of a mixture of air and ammonia suitable for catalytic treatment to oxidize the ammonia. The water leaving tower 36 through a pipe 63 may be stored and subsequently returned to tank 50 for again absorbing ammonia to form aqua ammonia suitable for treatment in stripping tower 36. If desired, a suitable proportion of the ammonia may be left in the water leaving tower 36 by regulating the proportions of aqua ammonia introduced into the tower and air contacted with the aqua ammonia and the degree of heating of the air and liquor in tower 36. The resulting relatively dilute aqua ammonia may be utilized in the production of fertilizers as, for example, by addition to a superphosphate.

The apparatus of Fig. 5 also includes a pipe 64 leading from the bottom of tank 48 into tank 50 and the ammoniacal solution from tank 48 may be introduced into tank 50 and thence transferred to tank 53 and passed into stripper 36 where it may be treated with air to vaporize ammonia from the solution in the manner described for the treatment of ammoniacal-urea solutions in the stripping tower of Fig. 4. The ammonia-air mixture thus obtained leaves tower 36 through a pipe 65, and the residual sodium nitrate solution containing more or less ammonia is withdrawn from the tower through pipe 63.

The apparatus of Fig. 5 also includes a pipe 66 and flow regulator 67 through which gaseous ammonia vaporized from the solution in tank 48 may be directly withdrawn, mixed with the desired proportion of oxygen and passed directly to an ammonia oxidation system. The solution in tank 48 containing a reduced proportion of ammonia may then be passed into tank 50 for treatment in stripper 36 to recover additional ammonia in the manner described above, or it may be withdrawn through a pipe 68 for use in the production of fertilizers. If desired, provision may be made for heating the solution in tank 48 to facilitate vaporizing the desired proportion of its ammonia content before withdrawing the solution from tank 48 for use in the preparation of fertilizers. Tank 48 is also provided with a pipe 69 whereby water may be introduced into the solution in the tank.

The following example illustrates one method of treating an ammoniacal sodium nitrate solution utilizing the apparatus of Fig. 5. Such a solution containing for example

| | Percent |
|---|---|
| Sodium nitrate | 26 |
| Free ammonia | 50 |
| Water | 24 | and having a vapor pressure at ordinary atmospheric temperatures of about 50 to 100 pounds per square inch of gauge pressure, is introduced into tank 48 under its own vapor pressure into water, which has previously been passed into the tank from pipe 69, in the proportions of about 40 tons of the ammoniacal sodium nitrate solution to 20 tons of water. About 2½ tons of ammonia gas is permitted to vaporize and flow under its own pressure through pipe 49 into tank 50 into which about 7½ tons of water have been introduced. The ammonia is absorbed in the water to form about 10 tons of aqua ammonia containing 25% ammonia; the residual solution in tank 48 amounting to about 57½ tons, contains about 17½ tons of free ammonia, about 10½ tons of sodium nitrate and about 29½ tons of water. If desired, instead of introducing all of the water to be mixed with the ammoniacal solution in tank 48 before introducing the ammoniacal solution into the tank, the water and ammoniacal solution may be simultaneously introduced into the tank. This mode of operation facilitates maintaining the desired ammonia vapor pressure in tank 48 to force the ammonia gas into tank 50 while the ammoniacal solution is being introduced into tank 48. The heat evolved by dilution of the relatively concentrated ammoniacal solution in tank 48 also facilitates the vaporization of the ammonia from the solution. The ammoniacal solution in tank 48, which has been diluted with water and from which a portion of its original ammonia content has been vaporized, may be withdrawn from the tank and passed through pipe 68 for use in treating superphosphate. The aqua ammonia in tank 50 is passed to tank 53 and thence into stripping tower 36 where it is treated with air to recover a desired proportion of its ammonia content, and the weak aqua ammonia withdrawn from tower 36 may be returned to tank 50 for absorption of ammonia from additional quantities of ammoniacal sodium nitrate solution introduced into tank 48.

The process and apparatus of this invention include numerous features of practical importance in commercial operations. Many fertilizer plants, for example, require for the preparation of mixed fertilizers not only nitrogenous chemical fertilizer materials such as urea, sodium nitrate, ammonium nitrate, calcium nitrate, ammonium sulfate and the like, but also free ammonia and nitric acid which may be prepared by the catalytic oxidation of ammonia. There are also available at many synthesis plants both ammonia and nitrogenous chemical fertilizers. By employing the process and apparatus of this invention, the chemical fertilizers and ammonia may be conveniently shipped in the form of ammoniacal solutions of the solid substances whereby liquid compositions containing high proportions of valuable ingredients but having relatively low vapor pressures as compared with anhydrous liquid ammonia and concentrated aqua ammonia, may be shipped, thus introducing material savings in transportation costs. On the other hand, my invention provides a method and apparatus for treating these ammoniacal solutions for the recovery therefrom of desired proportions of the ammonia contained in the solution for use separate from the other ingredients, particularly for oxidation to nitrogen oxides which may be used directly or after absorption in water to form nitric acid by the fertilizer manufacturer as, for example, for the treatment of phosphate rock to render the $P_2O_5$ content of the rock available as a plant food.

The following are specific examples of advantages derivable from this invention:

A concentrated aqueous solution of sodium nitrate and ammonia may be prepared and shipped in closed containers under its own reduced vapor pressure. The purchaser of this solution may then treat it in accordance with the process described above in conjunction with the apparatus shown in Figs. 1 and 2, for example, to convert the aqueous solution into a solution containing all of the nitrate but a smaller proportion of the ammonia, which solution will have a low vapor pressure and thus may be stored in low pressure equipment under substantially atmospheric pressures. The vaporized ammonia may be condensed to form a concentrated or substantially anhydrous liquid ammonia which requires for its storage high pressure equipment. The capacity of the high pressure storage vessels for containing the liquid anhydrous ammonia is, however, relatively small as compared with the capacity for the storage vessels required for the original sodium nitrate-ammonia-water solution, and any increase in the expenses for storing the anhydrous liquid ammonia because of its higher vapor pressure than the original aqueous ammoniacal solution is offset by the decreased expense involved in storing the smaller volume of residual ammonia-sodium nitrate-water solution having a vapor pressure of about atmospheric after removal of a portion of the ammonia.

Again, when instead of removing a portion of the ammonia and storing it in the form of substantially anhydrous liquid ammonia, the vaporized ammonia is transformed into aqua ammonia in the manner described above for the process as carried out in the apparatus of Figs. 1 and 2, for example, the invention is of advantage since both the residual sodium nitrate-water solution and the aqua ammonia containing a portion of the ammonia in the original relatively concentrated solution may have vapor pressures of about atmospheric and thus do not require high pressure equipment for their storage.

Numerous other advantages will be apparent from the foregoing description of my invention.

I claim:

The process for the preparation of a mixture of gases containing oxygen and ammonia suitable for the catalytic oxidation of the ammonia which comprises passing an oxygen gas into direct contact and in countercurrent flow with a liquid containing dissolved therein urea, carbon dioxide and free uncombined ammonia, thereby vaporizing ammonia from said liquid and producing said mixture of gases and introducing water into said liquid at a point near that at which the liquid is first contacted with the gas to retain carbon dioxide in the liquid while removing free uncombined ammonia present therein.

EDWARD W. HARVEY.